United States Patent [19]
Austin

[11] 3,990,953
[45] Nov. 9, 1976

[54] SILICON ELECTRODEPOSITION

[75] Inventor: Alfred Ells Austin, Worthington, Ohio

[73] Assignee: Battelle Development Corporation, Columbus, Ohio

[22] Filed: Nov. 17, 1975

[21] Appl. No.: 632,456

[52] U.S. Cl. .......................... 204/14 N; 204/59 R
[51] Int. Cl.$^2$ ........................................ C25D 3/02
[58] Field of Search ............ 204/14 N, 60, 39, 59 R; 106/287 SB

[56] References Cited
UNITED STATES PATENTS

| | | | |
|---|---|---|---|
| 3,022,233 | 2/1962 | Olstowski | 204/60 |
| 3,131,134 | 4/1964 | Micillo | 204/14 N |
| 3,580,828 | 5/1971 | Reddy | 204/14 N |
| 3,595,760 | 7/1971 | Ishibashi | 204/14 N |
| 3,616,280 | 10/1971 | Arnold | 204/14 N |

OTHER PUBLICATIONS

G. Szekely, Electrodeposition of Germanium, J. Electro Chem. Soc. 98, 1951, pp. 318–324.

Primary Examiner—T. M. Tufariello
Attorney, Agent, or Firm—Kenneth R. Warburton

[57] ABSTRACT

Elemental silicon of utility as a corrosion resistant coating, as an absorber in a solar thermal conversion system, etc. is provided by nonaqueous electrolytic deposition thereof on a cathode body through electrolytic reduction of a silicon halide or haloid silane compound as a solute in a liquid aprotic dipolar organic solvent for the compound by passing therethrough an electrolyzing current, generally at near ambient temperature and near atmospheric pressure yet under cover of an inert gas, and desirably by pulse electrolysis. The electroplating composition consists essentially of a nonaqueous solvent solution of the anhydrous liquid aprotic dipolar organic solvent, for example propylene carbonate, dimethylformamide, etc., containing the silicon solute, such as illustrated by silicon tetrachloride and trichlorosilane, in an amount providing, or providing by inclusion therewith of a dissociable electrolyte (e.g. tetrabutylammonium perchlorate), an electrical conductivity, generally greater than one m Mho, requisite to reduce the silicon solute.

20 Claims, 1 Drawing Figure

SILICON ELECTRODEPOSITION

The present invention relates to the art of electrochemistry, and particularly to electrochemical deposition of silicon. More specifically the invention concerns electrolytic reduction and deposition of elemental silicon onto an electrically conductive cathode from a silicon halide or haloid silane compound in a liquid aprotic dipolar organic solvent for the compound.

BACKGROUND

Silicon is not found in nature as the free element but instead occurs in various minerals, such as silica and silicates, amounting to approximately one-fourth of the earth's crust. Compounds containing silicon account for its greatest usage, such as silica in glass manufacture. However, elemental silicon itself is commercially important with very important usages thereof being in semiconductors, transistors, rectifiers, and like electronic components. Additional usages of elemental silicon are in metal alloy preparation, for deoxidizing steel, in providing protective coatings, and in thermal energy applications such as a solar thermal absorber and such as in photovoltaic cells for direct conversion of solar energy to electricity through their absorption of incident solar photons. Although used as the element per se in some such applications, more generally the elemental silicon is accompanied, i.e. doped, by controlled, minute amounts of other materials to provide particular properties requisite for its specific utility.

The elemental silicon purity required for a particular usage generally dictates its particular method of preparation. An ordinary commercially pure form of silicon, such as for an alloying additive, can be obtained by reduction of silicon dioxide with carbon or calcium carbide in an electric furnace. However, where exceedingly high purity silicon is required, more complex and lengthy procedures are followed. For example, the ordinary chemically pure silicon, such as from an electric furnace preparation, is converted to a silicon halide or haloid silane, which then by fractional distillation is subsequently purified (e.g. freed of B, As, etc.). Such purified silicon compound then may be reconverted to elemental silicon of high purity, such as by hydrogen reduction in a hot tube or on a hot wire for silicon tetrachloride and silicon tetrabromide and such as by direct thermal decomposition on a hot wire for silicon tetraiodide. Thermal decomposition of silanes is another preparation route. To proceed to a "super-pure" silicon, such as requisite for electronic applications, the "pure" silicon generally is subjected to molten zone refining or the like. Illustrating the preceding are teachings in U.S. Pat. Nos. 2,944,874 (silicon by hot wire decomposition of liquid silanes), 3,011,877 (silicon by thermal decomposition or the like of gaseous silicon compounds), 3,014,791, (silicon by pyrolysis of silanes), 3,029,135 (purifying gases used in producing silicon), 2,747,971 and 2,901,325 (molten zone refining of silicon), and West German Patent No. 1,071,680 (silicon by reduction of silicon halide in organic solvents by alkali and alkali earth metals).

The prior art includes teachings of silicon electrodeposition from fused and/or molten salts or the like, such as illustrated in U.S. Pat. No. 3,022,233 and J. Can. Met. Quart. (1971), Nos. 4, p. 281-5. Such electrolyses in molten materials require high temperature; for example, greater than 1,000° C in the process taught in the just-mentioned Canadian journal. The high temperature introduces problems of containing the molten bath and the formation of silicides. Also, there is considerable opportunity for impurities to diffuse into the silicon. Only a brief note is known of a possible electrolysis of silicon at a much lower temperature, which note reads "As regards the action of silicon on metallic mercury, nothing very definite can at present be stated; but on subjecting a small vessel containing mercury in contact with an alcoholic solution of silicon fluoride to the action of a powerful battery, and afterwards subjecting the mercury to distillation, a small amount of amorphous silicon was obtained, but whether silicon, when in a nascent state combines with, or is soluble in, mercury still presents considerable doubt." H. N. Warren, "The Action of Silicon On The Metals Gold, Silver, Platinum, and Mercury," Chemical News, June 30, 1893, p. 303-4.

Metallic germanium, an element in Group IV of the Periodic Table, is taught as being electrodeposited from a solution of germanium tetrachloride in propylene glycol (G. Szekely, "Electrodeposition of Germanium," J. Electro. Chem. Soc. 98 (1951) p. 318-324). Also the art includes teachings of electroplating baths containing dimethyl sulfoxide (U.S. Pat. No. 3,616,280), tetrahydrofuran (U.S. Pat. No. 3,595,760), and propylene carbonate (U.S. Pat. No. 3,580,828) for electrodepositing various metals.

The present invention's electroplating composition and method of electrolytic deposition of elemental silicon provides and/or promises numerous important advantages over prior art of knowledge to the inventor. For example, the invention's method is operable at and/or near convenient room temperature and without employment of pressures differing greatly from atmospheric, even though a dry and inert gaseous atmospheric and substantially anhydrous and oxygen-free materials are employed. An important advantage of the invention is its providing low cost elemental silicon at an expected cost of deposited silicon at least in the ballpark of a several orders of magnitude less than that of presently available silicon for solar thermal absorber applications and with greater savings realized in comparison to conventional ultra-pure and doped ultra-pure silicon for photoelectric solar cell applications. Another important advantage of the invention is a decreased energy requirement of at least one order of magnitude in comparison with present processes for producing high purity silicon.

SUMMARY STATEMENT OF INVENTION

To practice the invention, elemental silicon is electrodeposited on an electrically conductive cathode body at convenient temperatures and pressures by passing an electrolyzing current through an electroplating composition which is a nonaqueous solvent solution of an anhydrous liquid aprotic dipolar organic solvent containing a solute which is a silicon halide or haloid silane. The electrodepositing is carried forth generally with the electroplating composition under cover of an inert gas and at a temperature between about 20° and 100° C and a pressure closely approximately to slightly above atmospheric presssure. In a preferred practice, the electrolyzing current is by square wave pulsing between about 0.1 to 10 Hz and at a cell potential between 0.6 and 6 volts. The inventions electroplating composition consists essentially of the nonaqueous solvent solution of the anhydrous liquid aprotic dipolar organic solvent containing the silicon halide or haloid silane as its silicon solute. The silicon solute is included in an amount providing between a 0.005 molar solution and a saturated solution and is present in an amount to provide, or by inclusion of a dissociatable electrolyte to provide, an electrical conductivity (generally of at least one m Mho) requisite to reduce the silicon solute without significant degradation of the solvent upon passages of the electrolyzing current therethrough. Particularly useful and preferred solvents are propylene carbonate and dimethylformamide. Particularly useful and preferred silicon solutes are the silicon chlorides and chloride silanes and especially silicon tetrachloride and trichlorosilane.

DESCRIPTION OF DRAWING

Novel aspects of the invention are clarified and better understood with reference to the drawing wherein:

FIG. I illustrates, partially in diagramatic and schematic format and in cross-sectional view, an apparatus which may be used for practice of the invention.

Figure 1:
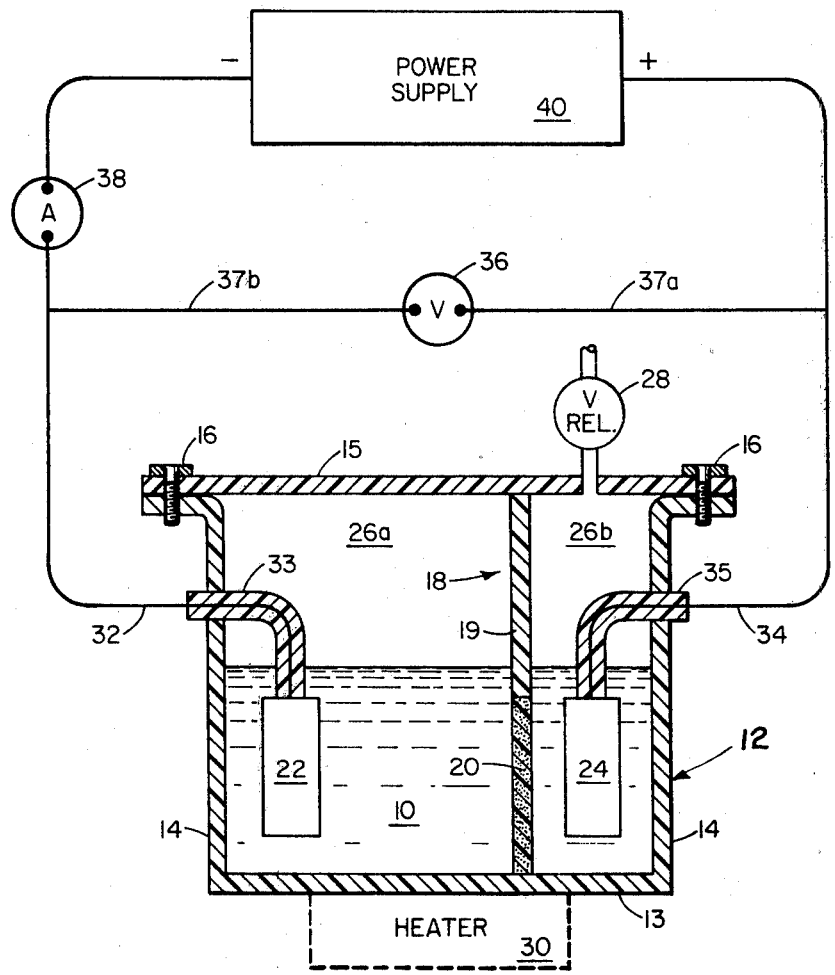

With reference to the drawing, the invention's electroplating composition can be used and the invention's method practiced in relatively conventional electroplating apparatus which avoids exposure of its electroplating composition to the atmosphere, with only minor modifications thereof upon considering the specific materials and parameters and the like employed in the invention. As illustrative thereof, in FIG. I an electroplating liquid composition 10 of the invention is disposed within any suitably sized and shaped vessel 12. Vessel 12 is of a nonconductive material nonreactive with electroplating composition 10 and may be quartz, silica, glass, polytetrafluoroethylene, polychlorotrifluoroethylene and the like. The illustrated vessel 12 includes a bottom 13, side walls 14, and a top 15, with top 15 hermetically sealable and sealed to side walls 14 by a fastening means, such as a plurality of self-tapping threaded screws 16. Vessel 12 includes a partition or barrier, generally designated 18, separating vessel 12 into two compartments. Partition 18, alike the material making up vessel 12, also is of any suitable nonconducting and nonreactive material, with its upper portion 19 extending from top 15 downward into composition 10 and being nonpervious to composition 10 and inert gases and halogen gases and with its lower portion 20 being porous and/or permeable to composition 10 and generally extending to the bottom of vessel 10. One compartment of vessel 10 contains the cathode 22, or cathodic member being plated with silicon, i.e. upon which elemental silicon is deposited and collected, and the other compartment contains the anode 24. Although not illustrated, the cathode can move and the apparatus be adapted to permit continuous operation such as depositing a silicon coating on a moving metal sheet as well as depositing silicon in a batch manner, by modification of the illustrated apparatus by conventional means known to the art for depositing on a moving cathode in a continuous-type operation. The volume of vessel 12 above composition 10 is filled with a dry inert gas, such as argon, helium, nitrogen, and the like, designated 26a in the compartment containing the cathode and designated 26b in the compartment containing the anode 24. Vessel 12 includes a venting release gas valve 28 to control and regulate gas pressure therewithin the compartment containing anode 24. Vessel 12 also can include, although not illustrated, inlet and outlets and valve means for introducing removing, and flowing therethrough the inert gas 26a and 26b and composition 10, as desired, as well as means for controlling their amounts within vessel 12. Although not illustrated, conventional means can be provided in vessel 12 to agitate and keep composition 10 circulating or moving within vessel 12. Composition 10 within vessel 12 can be heated to a desired plating temperature by a conventional heater 30 located exteriorly of vessel 12, or if desired by not-illustrated immersion heaters or the like immersed in composition 10. Electrical conductor 32, surrounded by polytetrafluoroethylene insulation 33, leads from cathode 22 and passes through sidewall 14 of vessel 12. Electrical conductor 34, surrounded by polytetrafluoroethylene insulation 35, leads from anode 24 and passes through sidewall 14 of vessel 12. A voltmeter 36 with requisite leads 37a and 37b is in parallel connection thereto and bridges conductors 32 and 34 so as to measure potential between the anode 24 and cathode 22. Conductor 32 has in series connection therewith an ammeter 38 so as to measure the electrical current. Conductor 32 from ammeter 38 and conductor 34 lead to a schematically designated power supply means 40. Power supply means 40 has its negative terminal on the circuitry side thereof leading through ammeter 38 and conductor 34 to cathode 22. Power supply means 40 is conventional means and apparatus, and, as desired for a specific practice of the invention, is adapted to provide off-on current switching, any to all of direct current, square wave pulsing, sine wave pulsing, intermittent and repetitive current flows, and the like, and in conjunction with the overall circuitry and apparatus to permit electrodeposition at potentiostatic conditions of a constant or varied cathode potential, as desired, and at galvanostatic conditions of a constant or varied electrolysis current, as desired.

In the present invention, the deposited elemental silicon originates from a silicon halide or haloid silane compound, which herein is sometimes referred to as a silicon solute in that it is dissolved in a liquid aprotic solvent therefor. The invention is operative employing silicon solute in the employed aprotic solvent in an amount as low as 0.0005M and lower. It also is operative in an amount up to and exceeding a saturated solution of the solute in the solvent. Conveniently useful amounts generally fall between 0.1 and 0.2M (molar solution).

Preferred silicon halides are of the generic formula

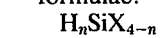

wherein X may be Cl, Br, or I, or a mixture thereof. Especially preferred silicon halides are silicon tetrachloride ($SiCl_4$), silicon tetrabromide ($SiBr_4$), and silicon tetraiodide ($SiI_4$). The mixed silicon halides, such as $SiClBr_3$, $SiCl_2Br_2$, $SiCl_3Br$, $SiClI_3$, $SiCl_2I_2$, $SiCl_3I$, $SiBr_3I$, $SiBr_2I_2$, and $SiBrI_3$, are contemplated as useful.

Preferred haloid silanes for the invention are of the formulae:

$H_nSiX_{4-n}$ wherein n may be the integer 1, 2, or 3, and X may be Cl, Br, or I or a mixture thereof; and

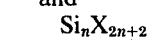

wherein X may be Cl, Br, or I, and n may be the integer 2, 3, 4, 5, or 6

The haloid silanes of the first presented formula include trichlorosilane ($HSiCl_3$), dichlorisilane ($H_2SiCl$), monochlorodisilane ($H_3SiCl$), tribromosilane ($HSiBr_3$), dibromosilane ($H_2SiBr_2$), monobromosilane ($H_3SiBr_3$), triodosilane ($HSiI_3$), diiodosilane ($H_2SiI_2$), and monoidosilane ($H_3SiI$). The trihalosilanes are preferred.

The haloid silanes, or silicon subhalides, of the second presented formula include hexachlorodisilane ($Si_4Cl_6$), octachlorotrisilane ($Si_3Cl_8$), decachlorotetrasilane ($Si_4Cl_{10}$), dodecachloropentasilane ($Si_5Cl_{10}$), tetradecachlorohexasilane ($Si_6Cl_{14}$), and the corresponding bromine and iodine silicon subhalides.

In the present invention, the term "solvent" is used to denote a liquid material which dissolves another material (i.e. the just-described silicon solute) and to denote the component, which is present in excess of all other components in such solvent solution of the silicon solute. The term "solvent solution" is intended to mean a single phase, homogeneous mixture of the silicon solute and a liquid solvent therefor from which by physical process and/or physical separation means (e.g. freezing, evaporation, distillation, chromography, etc.) one can separate and recover therefrom dissolved silicon solute and liquid solvent. Thus, where there are possible mixtures of the afore-described silicon solutes and various liquid solvent candidates therefor, those thereof are not true solvent solutions for purposes of the present invention when their mixtures do not form a homogeneous mixture which is a single phase, and when the solute and solvent candidate therein by physical processes or separation means are nonseparable from their mixture thereof for example in that their mixture is unstable and they have reacted with each other to form an insoluble precipitate.

The present invention employes a solvent for the employed silicon compound, i.e. the silicon halide or haloid silane or both, in its electroplating composition. Th employed solvent is a liquid at normal atmospheric pressure and a convenient useful electrodeposition temperature of not greater than about 100° C. Useful solvents are aprotic dipolar liquid organic compounds, and as employed solvents are substantially anhydrous. The useful solvents are organic in that their structure includes covalent carbon to hydrogen linkages. As employed, the solvent is essentially anhydrous, or free from water, to avoid any significant reaction with and wasteful depletion of the employed silicon halide or haloid silane. By "essentially anhydrous" there is intended to denote not only an absolute absence of water but also to mean that water up to 20 ppm of the solvent can be present without significant detriment to practice of the invention. Useful solvents are aprotic in that they neither lose a proton to nor gain a proton from the particular silicon halide or haloid silane employed therewith. The useful solvents are characterized as dipolar compounds in that they possess a dipole moment of at least 1.5 debyes at 25° C. In the electroplating composition, the employed solvent is stable to an electrical potential at least that requisite for the silicon electrodeposition, i.e. is stable and not decomposed or appreciably degraded at the employed reaction potentials at both the cathode and anode. The stability and non-reactivity of the employed solvent also extends to electrolytic reaction products of the employed silicon halide or haloid silane. Thus, the employed solvent is non-reactive to electrolytic reaction products, such as hydrogen and halogen gases.

The employed solvent by definition dissolves the solute (i.e. silicon halide or haloid silane), and for operability, at least to some extent, the amount dissolved can be quite small and even as low as an amount providing a 0.005M solution or a lower molar solution so long as ionic conductivity adequate for electrolysis is imparted to the electroplating composition by the employed amount of the silicon compound itself, or by an ionized adduct formed by the solvent with the silicon compound, or by an added auxiliary supporting electrolyte, described more fully subsequently. For the solvent to be useful, the solute should not react therewith to give an insoluble adduct or product.

Where a solvent-solute adduct is formed, it must be ionic rather than covalent. Further, the dielectric constant of the solvent must be large enough to assure that there takes place some dissociation of the ion pair constituting the adduct. In general the useful aprotic dipolar liquid organic solvents are categorized into two types or systems depending upon the solubilities of the silicon compound solutes, electrical conductivities of the solvent solutions, and kinetics of the electrode reactions. The first type are those in which the silicon halides are moderately soluble ($\leq 0.5$ molar) with very slight dissociation giving low conductivities ($\sim 5\mu$ Mho). The second type are those with limited solubility ($\leq 0.05$ molar), but with high dissociation and moderate conductivities ($\sim 1$ $m$ Mho). Systems of the first type require the addition of an auxiliary electrolyte to provide sufficient conductivity ($\sim 5$ $m$ Mho) for carrying electrolysis current. Propylene carbonate and tetrahydrofuran are illustrative solvents of the first type. Dimethylformamide is an illustrative solvent of the second type in which silicon halides are sufficiently dissociated for current conduction and electrode reduction reaction without requiring addition of a supporting electrolyte. However, solvents at the second type are operative with an added supporting electrolyte, and in some instances it is desirable to include the electrolyte for ease of operation.

Table A lists the solubilities and electrical conductivities of several haloid silanes and silicon halides in these solvents.

TABLE A

ILLUSTRATIVE SOLUBILITIES AND CONDUCTIVITIES OF SEVERAL HALOID SILANES AND SILICON HALIDES IN SEVERAL SOLVENTS

| Solvent | Silicon Compound | Solubility Molar | Electrical Conductivity |
|---|---|---|---|
| Propylene Carbonate (PC) | $SiHCl_3$ | 1.0 | 35 $\mu$ Mho |
| | $SiCl_4$ | 0.6 | 4 $\mu$ Mho |
| | $SiBr_4$ | 0.2 | 32 $\mu$ Mho |
| | $SiI_4$ | 0.01 | 64 $\mu$ Mho |
| Tetrahydrofuran (THF) | $SiHCl_3$ | Fully Miscible | 25 $\mu$ Mho |
| | $SiCl_4$ | Fully Miscible | 6 $\mu$ Mho |
| | $SiBr_4$ | 0.2 | 0.7 $\mu$ Mho |
| Dimethylformamide (DMF) | $SiHCl_3$ | 0.15 | 3.2 m Mho |
| | $SiCl_4$ | 0.15 | 2.7 m Mho |
| | $SiBr_4$ | 0.03 | 1.5 m Mho |
| | $SiI_4$ | 0.02 | 1.7 m Mho |

Cylic voltammetry data for the kinetics of electrode reactions indicate different electrodeposition reactions for the two types of solvent systems. The first type, illustrated by solutions in PC and THF, has two step reactions of a reversible chemical dissociation followed by inversible reduction. This is in agreement with the low degree of dissociation of the silicon solutes in these solvents. Here the reduction current is a function of the equilibrium constant and sum of the rate constants of the chemical reaction as well as the overpotential. The second type exhibits only the inversible reaction with current being normal function of overpotential and ionic concentration. The solution of SiBr₄ and SiI₄ in DMF are of this type with the silicon halides being nearly fully dissociated. With solvents of this second type generally the silicon solute dissociates sufficiently to provide ionic conductivity for an electron reduction reaction without need for addition of an auxiliary supporting electrolyte. However, generally also the solubility of the silicon solute in the solvent of the second type is low and this limits the capacity to deposit the elemental silicon. In such instances one provides for continual make-up or addition of the silicon solute to the electroplating composition, while avoiding addition of solute in excess of that soluble in the solvent in that disadvantageously excess solute fails to dissolve and/or leads to precipitation of a solid phase.

In addition to the already mentioned useful solvents of the first type of propylene carbonate and tetrahydrofuran, other illustrative useful solvent of this first type are acetonitrile (AN), dimethyl sulfite, sulfolane (tetramethylenesulfone), ethylene carbonate (EC). N,N-dimethylacetamide (DMA), is contemplated to be a useful solvent of of the second type.

As already mentioned, for the solvent to be useful in the invention it should be stable to the employed silicon compound dissolved therein to an extent not to form an insoluble material therewith. Formation of such insoluble material in the electroplating composition decreases conductivity and with increasingly formed amounts of insoluble materials tends towards lack of current passage and cessation of electrodeposition. Likewise the silicon in the solvent should not degrade upon its solvation so that a gas evolves therefrom or a solid precipitates therefrom. For example, although dimethylsulfoxide is an aprotic dipolar liquid organic compound, 0.05M amounts of silicon tetrachloride silicon tetraiodide and trichlorosilane, respectively, react therewith and/or else the silicon compound is so unstable therein, that a solid material and/or solid precipitate forms. Likewise there are other candidate solvents which also fail to be useful in the invention, such as γ-butyrolactone which in concentrations as low as 0.0025M reacts with trichlorosilane, silicon tetrachloride, silicon tetrabromide, and silicon tetradiodide, and also 1-methyl-2-pyrrolidone which reacts with 0.05M silicon tetrachloride to form an insoluble precipitate. Also protic solvents are not candidate solvents of utility in the invention, such as is illustrated by isopropyl alcohol which is capable of dissolution of some silicon halides but only with gas evolution therefrom.

Likewise for the solvent to be useful, the solution thereof of the employed silicon solute must have adequate electrical conductivity by itself, or by inclusion therein of an added auxiliary supporting electrolyte. For example, solutions of useful silicon compounds in propylene carbonate or tetrahydrofuran have low electrical conductivities in the order of less than 50 μ Mho and give no indication of any silicon reduction and electrodeposition in the absence of an added auxiliary supporting electrolyte, thus substantiating that useful solvents of the first type require the employment therewith of the auxiliary supporting electrolyte.

In the employment in the invention of the aforedescribed first type of solvent, as already mentioned, there is included an added auxiliary supporting electrolyte. The role of this supporting electrolyte is to provide an ionic conductivity high enough to enable electrodeposition of silicon. The added supporting electrolyte supplys a major part of the migration current so that the electrolytic reaction current is equal to the diffusion current at the cathode and anode. Obviously the employed supporting electrolyte dissociates and is soluble in the aprotic solvent, and also is stable at the electrical potentials employed for the electrodeposition of silicon. Some useful added auxiliary supporting elctrolytes don't and others do associate with to form a soluble complex adduct or the like with the employed silicon halide or haloid silane and thus impart sufficient electrical conductivity. Useful supporting electrolytes include: tetrabutylammonium perchlorate, tetrabutylammonium fluoroborate, and other tetraalkylammonium perchlorates and fluoroborates. Preferably the supporting electrolyte is a tetra(lower alkyl, i.e. $C_1$–$C_4$) ammonium perchlorate or fluoroborate. The choice and selection of a specific electrolyte for a particular bath composed of a particular aprotic solvent and a particular silicon halide or haloid silane depends principally upon its stability therewith and its possessing adequate solubility and imparting requisite electrical conductivity to the electroplating composition or bath. Requisite bath electrical conductivities preferably are in the order of 5 to 10 m Mho, although the invention's silicon deposition process is operable at an electrical conductivity as low as 1.0 Mho and lower with significantly decreasing deposition efficiency as the bath's conductivity is decreased.

In practice of the electroreduction and deposition of silicon by the method of the invention, one works within an apparatus excluding the normal atmosphere, and most desirably under cover of a dry inert gas atmosphere of helium, argon, nitrogen, or the like. The employed atmosphere is dry and oxygenfree to avoid hydrolysis or oxidation reaction of the employed silicon halide or haloid silane solute. Hereto, as in the electroplating, composition, the inert gas need be only essentially dry which for purposes of this invention can range from an absolute absence of water vapor up to 20 ppm of water vapor, and possibly higher, without significant detriment to practice of the invention. For laboratory practice, for example a commercially available glovebox, equipped with an evacuable antichamber, can be used for the dry atmosphere work chamber. Argon, dried by passing through 80 mesh molecular sieves and over copper turnings at 400° C, is useful as a work chamber atmosphere. A continuous flow of argon such as at 0.1–0.3 standard liters per minute, can be maintained through the work chamber at a positive pressure equivalent to about one cm water. Additionally, a supply of $P_2O_5$ can be maintained in the glove-box. Although no analysis of the work chamber atmosphere generally is necessary, it can be monitored qualitatively by a freshly scraped lithium ribbon being suspended in the work chamber. In specific examples described hereafter, the just-described glove-box flowing argon atmosphere, lithium ribbon, etc. are employed, and after each example the surface of the lithium ribbon continues to be shiny with no change in its appearance, thus indicating that a dry inert gas atmosphere is maintained above and over the example's particular electroplating composition during the electrodeposition described in the specific example. Advantageously in comparison to electrodeposition from molten materials, the invention's electrodeposition is carried forth at convenient and relatively modest temperatures and rarely if ever at a temperature above 100° C. Preferred operative temperatures range from about 20° C up to vaporization temperature of the silicon solute. Likewise the pressure within the electrodeposition apparatus generally approximates atmospheric pressure, although desirably and preferably is slightly above atmospheric pressure (i.e. is a slight positive pressure), with pressures higher than atmospheric deemed useful. The combination of employed temperature and pressure is such that the electrodeposition is a liquid, and also is such as not to exceed the boiling point of the employed aprotic solvent. The employed temperature-pressure combination, whether an inert gas is flowing therethrough or maintained as stable atmosphere over the electroplating composition, is such as not to exceed a temperature whereat any substantial amount of the silicon solute is vaporized from the electrodeposition composition with generally temperatures above the boiling point temperature of the particularly employed silicon solutes being avoided for the electroplating composition. However, although not illustrated, use of a condenser to liquify any vaporized silicon solute and return it to the electroplating composition is within the invention's scope.

For each of the numerous useful combinations or systems of aprotic solvent, silicon solute, electrode materials, and supplementary electrolyte included in some solvents, there exist an operative electrical potential range and operative silicon reduction potential range. The operative range for each can be determined readily by cyclic voltammetry by those skilled in the art. For example, by cyclic voltammetry and with a silver reference electrode determined operative ranges are for the system employing propylene carbonate from −3.0 to +2.2 volts, for the system employing tetrahydrofuran from −2.8 to +1.5 volts, and for the system employing dimethylformamide from −2.5 to +1.25 volts. Illustrative of inoperative potential parameters is an observation of an apparent polymer formation in tetrahydrofuran at cell potentials above 4 volts.

Generally in the invention's electrodeposition the cell parameters of current and voltage can vary with deposition time. By employing square wave pulsing at 0.1 to 10 Hz under potentiostatic conditions, i.e. to a constant cathode potential, the cell current decreases with time. This can be noted in a later described Example 5 of trichlorosilane in propylene carbonate wherein a uniform deposit is obtained at 50° C and the current decreases from 1.6 to 0.05 ma over a 180 minute period. In contrast in a like example except under a galvanostatic mode (i.e. at a constant electrolysis current), both the cell voltage and cathode potential will increase with time of deposition.

The useful aprotic solvents are essentially anhydrous as employed in the invention, i.e. they contain therein less than 20 ppm of water. These solvents can be prepared in anhydrous form by conventional techniques. For examples two solvents used in examples, propylene carbonate (PC) and tetrahydrofuran (THF), are each dried by trickling through a 50 cm column packed with pelletized, type AA molecular sieves. The THF, dried by this process, has a conductivity of about 1.25 $\mu$ Mho and is used without further purification. After drying, the PC is further purified by vacuum distillation. The distillation column is operated with a kettle temperature of 115°±5° C and a head temperature of 80°±2° C. The temperature gradient along the column is adjusted to produce the desired head temperature and a reflux ratio of about 10:1. The distillate is collected in receiving flasks, fitted with polytetrafluroethylene stopcocks, so that they can be filled under reduced pressure and transferred directly to the workchamber. Four cuts, each representing approximately 20 percent of the initial charge, are collected. The first 20 percent cut and the final 20 percent remaining in the kettle are discarded. An evaluation of the purification procedure and of the PC distillate is made through gas chromatographic analysis of the various distillate cuts. The results of these analyses along with conductivity are given in Table B.

The analyses are made using a Dorian Model 1720 gas chromatrograph, equipped with a thermal conductivity cell and a 2 foot by ¼ inch stainless column, packed with 100 mesh porous polymeric beads of styrene/divinylbenzene copolymer such as Prorpak Q, sold by Waters Associates. The methods used are essentially those of Jasinski and Kirkland. (Jasinski, R. J., Kirkland, S., Anal. Chem. 39, 1663 (1967). Standard solutions of 10 ppm and 20 ppm water in cyclopentane are used for calibration in determining water.

| Sample | Conductivity $\mu$ mho | $H_2O$ ppm | Propylene Glycol, ppm |
| --- | --- | --- | --- |
| Starting material | — | 58 | 2,000 |
| 1st cut | 10.9 | 16 | 10,000 |
| 2nd cut | 1.3 | 10 | 400 |
| 3rd cut | 0.8 | 12 | 100 |
| 4th cut | 0.5 | 23 | 30 |

Examples of the invention follow: In the examples the electrodeposition is pulse electrolysis with square wave pulsing either potentiostatically, or galvanostatically using a potentiostat. Also generally about 100ml. of the electroplating composition is employed and the employed metal electrodes (both cathode and anode) are held in polytetrafluroethylene with only one surface of each exposed and for the cathode this exposed surface approximates 0.65 cm². In all of these examples, the deposits were silicon according to electron microscopic analysis.

EXAMPLE 1

Propylene carbonate (PC), suitably dried and vacuum distilled as described earlier, is transferred under inert gas pressure to an electroplating glass vessle which previously has been scrupulously cleaned and flushed and filled with dried flowing argon gas. Amounts providing solutions in the propylene carbonate of 0.2 M silicon tetrachloride, ($SiCl_4$), and 0.75 M tetrabutylammonium perchlorate, ($Bu_4NClO_4$), are added and dissolved in the propylene carbonate. The anode and cathode each are of platinum. The potential of the cathode is −2.0 volts and the cell potential is about 4.2 volts with electrolysis carried out at a temperature of 25° C and a current density initially of 0.6 ma/cm² which is gradually decreased 0.35 ma/cm² by the close of the example. After 320 minutes the cathode is covered with whitish-grey, about 2 to 3 microns and greater in thickness, clumps of silicon nearly completely grown together. Nondispersive X-ray analysis in the scanning electron microscopic shows that the deposits are silicon. Analysis for impurities by mass spectrograph analysis gave silicon as the major constituent with no $SiO_2$ and SiO detected, only traces (less than 10 ppm) detected of sulfur, aluminum, and hydrocarbons below mass unit of 80 and detectable traces (less than 10 ppm) of those elements of Cl, Fe, Al, Ag, Ca, Na, Cu, Cr, B, and Pd typically also noted in the employed platinum cathode. Electron diffraction of surfaces of the deposited silicon showed most to be amorphous.

EXAMPLE 2

In repetition of Example 1 except at 25° C for 120 minutes and with a current density of 0.2 to 1.0 ma/cm$^2$ at a cathode potential of −2.25 volts and cell potential of about 4 volts, the platinum cathode is covered with heterogenous patches of silicon, as identified by scanning electron microscope. Reflection electron diffraction of the deposited silicon surfaces provides a crystalline pattern identified as body-centered silicon.

EXAMPLE 3

Example 1 is repeated except the electrolysis is carried forth with the propylene carbonate solution at 85° C. A constant flow of dried argon gas in the order of 0.1 to 0.3 standard liters per minute passes through the space above the propylene carbonate during electrolysis. The obtained deposit of silicon on the cathode is very thin, most likely because of loss of silicon tetrachloride through its vaporization and the vapor being carried from the electroplating vessel by argon flowing therefrom. In the absence of flowing argon and with pressurized argon in the space over the propylene carbonate, thicker deposits of silicon are obtainable.

The following Table I presents date of Examples Nos. 4 to 11, employing propylene carbonate with various silicon compounds at various deposition parameters. In each the anode is of platinum. For each the obtained deposit on the cathode is confirmed to be silicon by nondispersive X-ray analysis in a scanning electron microscope. In Example 5, the deposited elemental silicon is noticeably uniform with a fine matt surface.

The following Table II presents additional examples, Example 12 through 15, in which tetrahydrofuran (THF) is employed as the solvent in the liquid electroplating composition. In general the procedure and technique described in example 1. is followed, unless noted otherwise, with pertinent data and information of these examples presented in Table II. Nondispersive X-ray analysis in the scanning electron microscope for the deposits in each example show that the deposits are silicon. Mass spectrograph analysis for impurities typically as in the deposit of Example 14 gave only silicon as the major constituent with no detection of SiO$_2$ or SiO and only traces (less than 10 ppm) of S and Al the hydrocarbons below mass unit 80. Other noted elements detectable as trace elements (less than 10 ppm) are Cl, Fe, Al, Ag, Ca, Na, Cu, Cr, B, and Pd typically noted also in the employed platinum cathode.

TABLE II

| Example No. | Solution | Cathode | Temp. °C | Current Density ma/cm$^2$ | Cathode Potential Volts | Cell Potential Volts | Time Min. |
|---|---|---|---|---|---|---|---|
| 12 | 0.2M SiHCl$_3$ +1.0M + Bu$_4$NClO$_4$ In THF | Pt | 25 | 10 | −2.75 | 6 to > 10 | 110 |
| 13 | " | Pt | 25 | 1.0 to 0.005 | −1.5 | 2.4 | 420 |
| 14 | " | Pt | 25 | 1.0 | — | 4.0 to 5.0 | 390 |
| 15 | " | Pt | 25 | 2.5 | −2.0 | — | 30 |

EXAMPLE 16

Generally the procedure and technique of Example 1 are followed except that acetonitrile, (CH$_3$CN) is employed as the solvent with dissolving therein of amounts providing 0.02M silicon tetrafluoride and 0.1M tetrabutylammonium perchlorate. The cathode is platinum and the anode is platinum. Operating temperature is 25° C; the current density is 5 ma/cm$^2$; the cathode potential is −2.2 volts; the cell potential is 6.2 volts; and electrolysis is carried forth for 60 min. The resulting deposit on the cathode is determined to be silicon by scanning electron microscopic analysis.

EXAMPLE 17

Generally the procedure and technique of Example 1 are followed except that dimethylsulfite, (CH$_3$)$_2$SO$_2$, is employed as the solvent with dissolving therein of amounts providing 0.06M silicon tetrachloride and

TABLE I

| Example No. | Solution | Cathode | Temp. °C | Current Density ma/cm$^2$ | Cathode Potential Volts | Cell Potential Volts | Time min. |
|---|---|---|---|---|---|---|---|
| 4 | 0.2M SiHCl$_3$ +0.75M Bu$_4$NClO$_4$ in PC | Pt | 25 | 0.4 | −3.0 | ~4.0 | 45 |
| 5 | " | Pt | 50 | 1.6 to <0.06 | −3.0 | ~4.0 | 180 |
| 6 | " | Pt | 85 | | | | |
| 7 | " | Ni | 50 | 0.20 | −1.85 to −2.7 | 3.2 to 4.5 | 265 |
| 8 | " | Fe | 50 | 0.45 | −1.7 to −3.9 | 3.6 to 6.0 | 260 |
| 9 | 0.2M SiCl$_4$ +0.75M Bu$_4$NBF$_4$ in PC | Pt | 25 | 1.0 | — | 4.2 | 600 |
| 10 | " | Ni | 25 | 1.0 to 2.5 | — | 4.2 | 150 |
| 11 | 0.1M SiBr$_4$ +0.75M Bu$_4$NClO$_4$ in PC | Pt | 50 | 0.35 | −7.5 to −3.0 | 1.7 to 4.4 | 329 |

0.1M tetrabutylammonium perchlorate. The cathode is platinum and the anode is platinum. Operating temperature is 25° C; the current density is 5 ma/cm$^2$; the cathode potential is 0.7 volts; the cell potential is 4 volts; and electrolysis is carried forth for 120 minutes. The resulting deposit on the cathode is shown to be silicon by scanning microscopic analysis.

EXAMPLE 18

Generally the procedure and technique of Example 1 are followed except that tetramethylenesulfone, also called sulfolane, $(CH_2)_4SO_2$, is employed as the solvent with dissolving therein of amounts providing 0.1M silicon tetrachloride and 0.1M tetrabutylammonium perchlorate. The cathode is platinum and the anode is platinum. Operating temperature is 40° C; the current density is 1 to 4 ma/cm$^2$; the cathode potential is −1 to −2 volts; the cell potential is 4.5 to 5 volts; and electrolysis is carried forth for 180 minutes. The resulting deposit on the cathode is confirmed to be silicon by scanning electron microscopic analysis.

The following Table III presents additional examples, Examples 19 through 21. In these examples the solvent is dimethylformamide (DMF), $(CH_3)_2NCHO$. In general the procedure and technique of Example 1 are followed unless noted otherwise with pertinent data and information on these examples presented in Table III. For each of Examples 19 through 21, the resulting deposit is confirmed to be silicon by scanning electron microscopic analysis.

TABLE III

| Example No. | Solution | Cathode | Temp. °C | Current Density ma/cm$^2$ | Cathode Potential Volts | Cell Potential Volts | Time min. |
|---|---|---|---|---|---|---|---|
| 19 | 0.01M SiBr$_4$ in DMF | Pt | 25 | 0.05 to 0.025 | −1.5 | 2.7 | 60 |
| 20 | 0.002M SiBr$_4$ +0.1M Bu$_4$NClO$_4$ | Pt | 25 | 0.1 | 0.65 | 3.0 | <1 |
| 21 | 0.02M SiI$_4$ in DMF | Pt | 25 | 0.8 to 0.2 | −1.0 | 4.5 | 100 |

In the foregoing DMF solutions, the current decreases with time under potentiostatic operation. In Example 21 employing the iodide solution, some yellow-red iodine formed at the anode, but process operation with deposition of elemental silicon on the cathode is possible Phase and crystallinity of the elemental silicon deposits by the preceding examples were ascertained. Reflection electron diffraction of most deposits gives an amorphous band pattern which could be due to a thin absorbed surface film. One thin deposit of heterogeneous clumps gave a weak crystalline electron diffraction. The thickest deposit of about 10 microns in Example 10 was shown to be cubic "body-centered" silicon by X-ray diffraction.

Some indication of the electrical conductivities of the deposits in Examples 4-8 and 11 is obtainable from measurement of the overall cell conductivities before and after deposition of the deposits from solutions of SiHCl$_3$, SiCl$_4$, and SiBr$_4$ in PC. In the case of uniform coatings the change in cell conducivity is ascribable to resistance of the silicon coating since there is insignificant change in the solution composition. Measurements of the solutions separately in conductivity cells confirms this assumption. The silicon deposits of about 3 $\mu$ thickness have resistance of 500 to 1500 ohms at 25° C. The temperature dependence (from 50° to 25° C) indicates semiconductivity with activation energies of about 0.2 ev. The resistivities are of the order 10$^6$ ohm-cm. These are of the order measured for vapor deposited amorphous silicon and a factor of 10 greater than for intrinsic crystalline silicon. Silicon electrodeposited at near to room temperature, 25° to 50° C, has high resistivity, p >40 10$^5$ ohm-cm. The low conductivity of the deposit limits the cathodic current for the electrodeposition. Thus, at constant cell potential the current decreases particularly markedly for thickness greater than a few tenths of micron. At constant current the cell potential increases leading to possible electrolyte breakdown. The voltage-current-silicon thickness relationship indicates that there is a space charge buildup for electron injection at the electrode/-deposit interface when silicon deposits are greater than 0.1 micron thick.

Elemental silicon deposited in Examples 9 and 10 had low resistivity of about 20 ohm-cm. In these depositions, the cell voltages and current remained constant. The deposited silicon contained boron, which is a known dopant for lowering resistivity and providing of semiconductive silicon compositions. Thus Examples 9 an 10 indicate that resistivity of the deposited silicon can be decreased by pick up of dopant from the electroplating composition.

Although the foregoing specific examples illustrate application of the invention for electrolytic deposition of silicon on cathode bodies of platinum, nickel, and iron, it should be understood that useful cathodic bodies can be numerous materials and various shapes and forms with the elemental silicon deposited thereon. Useful cathodic bodies are electrically conductive and nonreactive or stable to the invention's employed electroplating composition at the process parameters employed for the silicon electrodeposition. The useful cathodic body can be composed entirely of, or only its surface of, silicon or of conductive material or metal, such as platinum, nickel, silver steel, aluminum, and the like. As desired, the silicon can be electrodeposited as massive deposits or as thin coatings. Conventionally shaped cathodic bodies may be used as well as cathodes which are films, specifically shaped articles, etc. for deposition of silicon thereon.

The silicon produced in the foregoing examples is of a purity adequate for utility as a corrosion resistant coating to corrosive environments, such as dilute sulfuric acid, hydrochloric acid, and nitric acid. The silicon produced in each of the foregoing examples also is of a purity adequate for utility as an absorber in a solar thermal conversion system by virtue of its intrinsic absorption of the incident solar spectrum. The deposited silicon also is of sufficient purity for use in molten zone refining to obtain ultra-high purity silicon susceptible to doping by conventional procedures and techniques to provide useful photovoltaic cells.

Although the invention has been described, taught and disclosed herein with specificity, it is to be understood that the foregoing disclosure is to be deemed merely illustrative of the invention with various changes in details, materials, and procedures being obvious and possible and being within the skill of those skilled in the art and with all such changes falling within the true scope and meaning of the invention insofar as they are encompassed within the principles and scope of the invention as expressed in the appended claims.

I claim:

1. A method for electrodeposition of elemental silicon on an electrically conductive cathode body, which method comprises: passing an electrolyzing current from an anode to the cathode body through an electroplating composition which is a nonaqueous solvent solution of an anhydrous liquid aprotic dipolar organic solvent containing a solute which is a silicon halide or haloid silane compound in an amount providing, or providing by supplementary inclusion in the solvent therewith of a dissociatable electrolyte, an electrical conductivity requisite to reduce said compound to deposit elemental silicon on the cathode body.

2. The method of claim 1 in which the passing of the electrolyzing current is with the electroplating composition under cover of an inert gas.

3. The method of claim 2 employing as the solute a silicon halide of the formula.

$$SiX_4$$

wherein X is Cl, Br, or I, or a mixture thereof, or a haloid silane of the formula of $$H_nSiX_{4-n}$$

wherein n is the integer 1, 2, or 3, and X is Cl, Br, or I, or a mixture thereof, or $$Si_nX_{2n-2}$$

wherein X is Cl, Br, or I, and $n$ is the integer 2, 3, 4, 5, or 6.

4. The method of claim 2 employing argon as the inert gas and at a pressure greater than atmospheric pressure.

5. The method of claim 2 in which the passing of the electrolyzing current is with the electroplating composition at a temperature below the vaporization temperature of the solute and between 20° and 100° C.

6. The method of claim 2 in which the electrical conductivity is at least 1 $m$ Mho.

7. The method of claim 6 in which the passing of the electrolyzing current is by square wave pulsing between 0.1 and 10 Hz.

8. The method of claim 7 in which cell electrical potential is between 0.6 and 6 volts.

9. The method of claim 2 employing the anhydrous liquid aprotic dipolar organic solvent selected from the group consisting of propylene carbonate, tetrahydrofuran, acetonitrile, dimethyl sulfite, tetramethylenesulfone, ethylene carbonate, N,N-dimethylacetamide, and dimethylformamide.

10. The method of claim 2 employing the anhydrous liquid aprotic dipolar organic solvent of propylene carbonate and the solute which is silicon tetrachloride.

11. The method of claim 2 employing the anhydrous liquid aprotic dipolar organic solvent of propylene carbonate and the solute which is trichlorosilane.

12. The method of claim 2 employing the anhydrous liquid aprotic dipolar organic solvent of dimethylformamide and the inert dissociatable electrolyte which is tetrabutylammonium perchlorate.

13. An electroplating composition for electrolytic deposition of elemental silicon therefrom on a cathode body, which composition consists essentially of: a nonaqueous solvent solution of an anhydrous liquid aprotic dipolar organic solvent containing a solute of a silicon halide of haloid silane compound in an amount adapted to provide, or adapted to provide by a dissociatable electrolyte included in the solvent, an electrical conductivity requisite to reduce said compound upon passing an electrolyzing current through said composition.

14. The composition of claim 13 in which the solute is a silicon halide of the formula $$SiX_4$$

wherein X is Cl, Br, I or a mixture thereof or a haloid silane of the formula of $$H_nSiX_{4-n}$$

wherein n is the integer 1, 2, or 3, and X is Cl, Br, I, or a mixture thereof, or $$Si_nX_{2n+2}$$

wherein X is Cl, Br, or I, and $n$ is the integer 2, 3, 4, 5, or 6.

15. The composition of claim 13 containing the solute in the amount providing an electrical conductivity of at least 1 m Mho.

16. The composition of claim 13 i which the anhydrous liquid aprotic dipolar organic solvent is selected from the group consisting of propylene carbonate, tetrahydrofuran, acetonitrile, dimethyl sulfite, tetramethylenesulfone, ethylene carbonate, N,N-dimethylacetamide, and dimethylformamide.

17. The composition of claim 13 containing the solute in the amount constituting between a 0.005 M solution and a saturated solution in the anhydrous liquid aprotic solvent.

18. The composition of claim 17 in which the anhydrous liquid aprotic dipolar organic solvent is propylene carbonate and the solute is silicon tetrachloride.

19. The composition of claim 17 in which the anhydrous liquid aprotic dipolar organic solvent is propylene carbonate and the solute is trichlorosilane.

20. The composition of claim 17 in which the anhydrous liquid aprotic dipolar organic solvent is dimethylformamide and the inert dissociatable electrolyte is tetrabutylammonium perchlorate.

* * * * *